United States Patent
Alapuranen

(10) Patent No.: US 8,761,295 B2
(45) Date of Patent: Jun. 24, 2014

(54) INTERFERENCE MITIGATION METHOD FOR SINGLE OR MIMO RECEIVER DEVICES

(71) Applicant: XG Technology, Inc., Sarasota, FL (US)

(72) Inventor: Pertti Alapuranen, Deltona, FL (US)

(73) Assignee: XG Technology, Inc., Sarasota, FL (US)

( * ) Notice: Subject to any disclaimer, the term of this patent is extended or adjusted under 35 U.S.C. 154(b) by 0 days.

(21) Appl. No.: 13/667,006

(22) Filed: Nov. 2, 2012

(65) Prior Publication Data

US 2013/0114768 A1    May 9, 2013

Related U.S. Application Data

(60) Provisional application No. 61/556,868, filed on Nov. 8, 2011.

(51) Int. Cl.
*H04B 7/02* (2006.01)
*H04B 1/10* (2006.01)
(52) U.S. Cl.
CPC ..................................... *H04B 1/10* (2013.01)
USPC ............ 375/267; 375/224; 375/344; 375/260
(58) Field of Classification Search
None
See application file for complete search history.

(56) References Cited

U.S. PATENT DOCUMENTS

| | | | |
|---|---|---|---|
| 7,782,985 B2 * | 8/2010 | Wang | 375/344 |
| 2009/0083601 A1 | 3/2009 | Gorokhov et al. | |
| 2009/0106619 A1 | 4/2009 | Onggosanusi et al. | |
| 2009/0249151 A1 | 10/2009 | Zhou et al. | |
| 2011/0150118 A1 | 6/2011 | Asplund et al. | |
| 2011/0261894 A1 * | 10/2011 | Yu et al. | 375/267 |
| 2013/0235914 A1 * | 9/2013 | Duenyas | 375/219 |

OTHER PUBLICATIONS

Zemen et al, Successive Slepian Subspace Projection in Time and Frequency for Time-Varient Channel Estimation. Jun. 2005 [retrieved Dec. 21, 2012]. Retrieved from internet: <URL: http://www.eurasip.org/Proceedings/Ext/IST05/papers/422.pdf>, pp. 1-5.

* cited by examiner

*Primary Examiner* — Leon-Viet Nguyen
(74) *Attorney, Agent, or Firm* — Dennis L. Cook, Esq.

(57) ABSTRACT

A cognitive radio signal processing method suitable for single receiver devices where interference is mitigated using projection of received multi-dimensional signal space to maximize SNR by orthogonalizing interference is described. The method is based on a well-known LMS solution that is computed from received multi antenna and multicarrier signals in a novel way. This method solves the requirement of multiple RF chains in low cost handsets by introducing a protocol synchronous antenna switcher that allows, for example, a LTE handset with a single antenna to benefit from algorithms that typically require multiple receivers for the same frequency, i.e. MIMO.

4 Claims, 1 Drawing Sheet

INTERFERENCE MITIGATION METHOD FOR SINGLE OR MIMO RECEIVER DEVICES

CROSS-REFERENCE TO RELATED APPLICATION

The present application claims the benefit of previously filed Provisional Patent Application, Ser. No. 61/556,868 filed Nov. 8, 2011.

FIELD OF THE INVENTION

This invention describes a cognitive radio signal processing method suitable for single receiver devices where interference is mitigated using projection of received multi-dimensional signal space to maximize the signal to noise ratio (SNR) by orthogonalizing interference.

BACKGROUND OF THE INVENTION

Radio spectrum is a limited resource. A large amount of spectrum is required to deliver services that are associated with modern wireless personal communications. Typical examples are smart phone Internet applications, wireless streaming audio, and video, to mention a few. These services consume large amounts of spectral resources causing both financial and spectrum policy issues.

In modern cellular networks spectrum re-use is necessary. A macro cell may cover a large area and additional capacity in local areas is introduced by the use of micro, pico and femtocells. These devices often have lower transmit power than macro cells and they may also share the same spectrum. The interference issue with this type of high spectrum re-use can be severe because a cellular handset may receive macro cell signals and micro cell signals on same frequency and at the same amplitude, depending on location.

This invention describes method to allow a handset to separate desired micro, pico, or femtocell signals from undesired macro base station signals by using orthogonalization of the undesired signals. This method can be built into an existing LTE compliant system with hardware and software modifications without changes to the LTE protocol.

BRIEF SUMMARY OF THE INVENTION

This invention describes a novel method of interference mitigation that is suitable for single receiver devices, for example, LTE cellular handsets and smartphones. The interference mitigation method works by using projection of received multi-dimensional signal space to maximize SNR by orthogonalizing interference. The invention solves the requirement of multiple RF chains in low cost handsets by introducing a protocol synchronous antenna switcher that allows, for example, a LTE handset with single antenna to benefit from algorithms that typically require multiple receivers for the same frequency, i.e. MIMO.

For a fuller understanding of the nature and objects of the invention, reference should be made to the following detailed description taken in connection with the accompanying drawing.

DESCRIPTION OF THE DRAWINGS

For a fuller understanding of the nature and objects of the invention, reference should be made to the accompanying drawings, in which.

DETAILED DESCRIPTION OF THE INVENTION

In the method of the preferred embodiment interference is mitigated using projection to orthogonalize interference. The preferred embodiment method is based on the well-known LMS solution of $W=(A^T A)^{-1} * A^T * d$ that is computed from received multi-antenna and multicarrier signals in a novel way. (The basic method is described in U.S. application 61/494,497 filed Jun. 8, 2011). The method uses all 12 sub-carriers in a resource block to compute a projection matrix.

In the formula $W=(A^T A)^{-1} * A^T * d$ the d is the known signal (local reference) and matrix A is created from measured reference or channel sounding symbols. The receiver divides the received signal into multiple blocks where each block consists of N adjacent carriers, N=4 to 32. In LTE this number is beneficially 12 as there are 12 subcarriers in a single resource block. If a handset receives more than one resource block, each block requires an individual matrix, A, and a solution, W.

The preferred embodiment system would typically require a multiple antenna receiver, for example 2 to 4 receive antennas that are placed in a circular or other beneficial fashion in the handset. The received signal is multi-dimensional, each dimension represented by each individual antenna signal received. The digital baseband representation of each received antenna signal is a series of complex numbers (x+iy).

Figure 1:
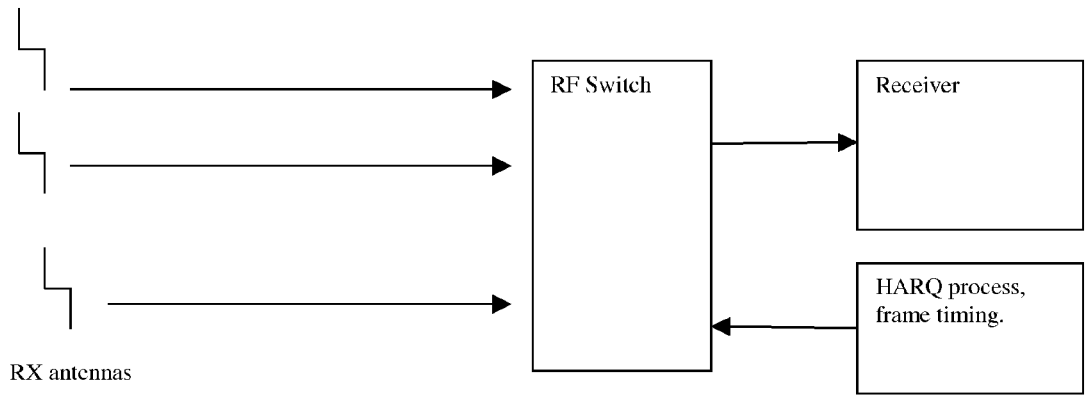
FIG. 1 is a diagram showing a handset receiver system.
Figure 2:
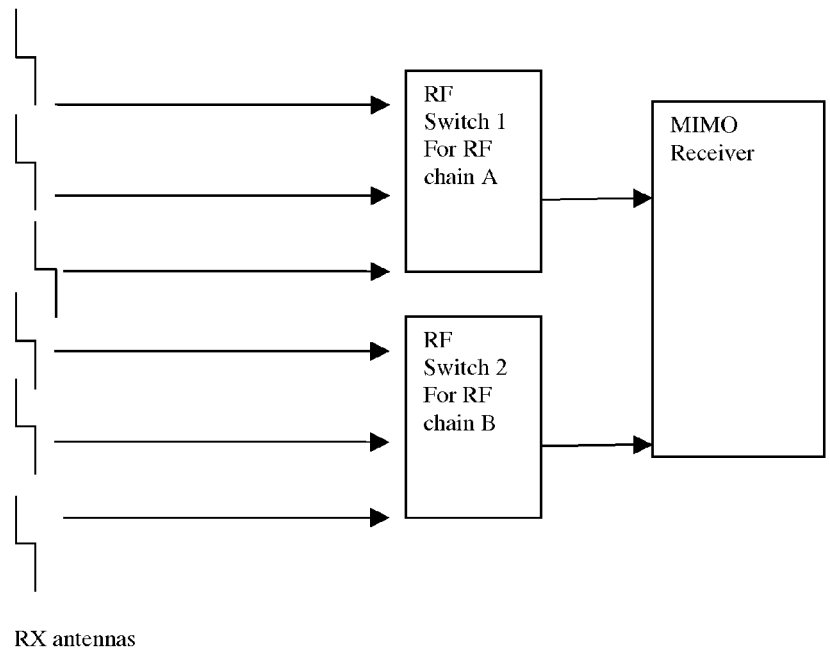
FIG. 2 is a diagram showing a MIMO receiver.

Matrix A is created by taking the complex received reference symbols and creating a matrix of M rows by N columns. The M rows contain symbols received by a receive antenna j, where $1 < j <= M$, and the columns consist of reference symbols received with that antenna. To create matrix A in an LTE compliant handset or receiver the HARQ (Hybrid Automatic Repeat ReQuest) procedure can be used. In HARQ when a user receives data correctly then the HARQ stop-and-wait protocol will not retransmit and creating matrix A would not add any signal receiving benefit because decoding was successful. However, when the first transmission on the PDSCH (Physical Downlink Shared Channel) channel was unsuccessful, the LTE HARQ will resend the exact same data. This process can be used by the interference mitigation method of this disclosure by introducing an antenna switch that switches to a different antenna for every frame or retransmission of the same data, i.e. a new antenna is continuously switched every 5 ms, or after an unsuccessful reception. The number of different antennas sets the limit for the number of rows in matrix A. For example, a handset with 3 antennas can have 3 different rows in matrix A, i.e. M=3. FIG. 1 shows such a handset receiver system where the RF switch connects three individual antennas to the receiver. Antenna switching is synchronized to the downlink frame and HARQ process so that every successive frame can be received using a different antenna. FIG. 2 shows a MIMO receiver implementing this invention where each receiver chain has an individual RF antenna switch and three antennas.

The disclosed system rotates through the receive antennas such that each version of PDSCH retransmission is received using a different antenna. Typically the antenna polarization and beam pattern is varied in an antenna design that has a low envelope correlation factor. The correlation factor should be lower than 0.5 for high performance.

The interference mitigation system operates using the HARQ process. After an unsuccessful reception the device creates matrix A by combining data from received copies where every copy is received using a different antenna. The device normally decodes the frame using MRC, however, if MRC CRC fails then the system computes projection matrix W that can then be used to orthogonalize interference from the macro cell (undesired signal) so that the SNR of the desired signal is improved.

Reference or channel sounding symbols are used to create a M*(N*k) matrix where k is an integer representing the number of consecutive sounding symbols used. For computation the matrix (M*(N*k) is transposed and the vector W of M complex coefficients is computed using the formula $W=(A^TA)^{-1}*A^T*d$. The vector d is concatenated from k symbols, i.e. is of the dimension (N*k)*1 and contains reference symbols transmitted by the desired transmitter, i.e. micro or picocell. The vector d has to have low cross correlation to the sequence transmitted by the interfering base station, i.e. the macro cell.

The output W consists of M complex numbers that are used to compute the projection. For example the received M antenna signals are multiplied by the vector W. For this multiplication the vector W is used for the "frequency block" of N subcarriers. The M in a single antenna LTE system can be 2 or more, depending on the number of retransmissions the HARQ process requires.

Since certain changes may be made in the above described system and method for an interference mitigation method without departing from the scope of the invention herein involved, it is intended that all matter contained in the description thereof shall be interpreted as illustrative and not in a limiting sense.

What is claimed is:

1. A system for interference mitigation caused by undesired signals received by a receiver device using LTE protocol comprising:

said receiver device having an antenna switch that is synchronized to a frame timing of a Hybrid Automatic Repeat ReQuest process in an LTE compatible mobile device or base station;

wherein said antenna switch switches between N antennas allowing the receiver to synchronously rotate between said N antennas in accordance with said frame timing;

said receiver then creating a matrix of channel sounding or reference symbols and then said receiver using said matrix to mitigate interference from undesired signals by said receiver orthogonalizing said undesired signals to a desired signal being received by using subspace projection in frequency domain to orthogonalize interference from undesired signals to the desired signal wherein the undesired signals are transformed into frequency domain using Fourier or Fast Fourier Transform and some or all of the complex outputs from the transform are subcarriers; and, wherein when processing the undesired signals a signal matrix A is created by concatenating k adjacent subcarriers data from channel sounding or reference symbols into a matrix creating an M*(N*k) matrix where k is an integer representing the number of consecutive training symbols used and then transposing said matrix M*(N*k) and then a vector W of M complex coefficients is computed using the formula $W=(A^TA)^{-1}*A^T*d$ and then the vector d is concatenated from k symbols.

2. The system of claim 1 wherein N is 2 to 4.

3. The system of claim 1 having a MIMO receiver comprising multiple sets of antennas that are switched in parallel.

4. The system of claim 1 that uses polarized antennas where different polarizations are used successively by said antenna switch.

* * * * *